Patented June 7, 1932

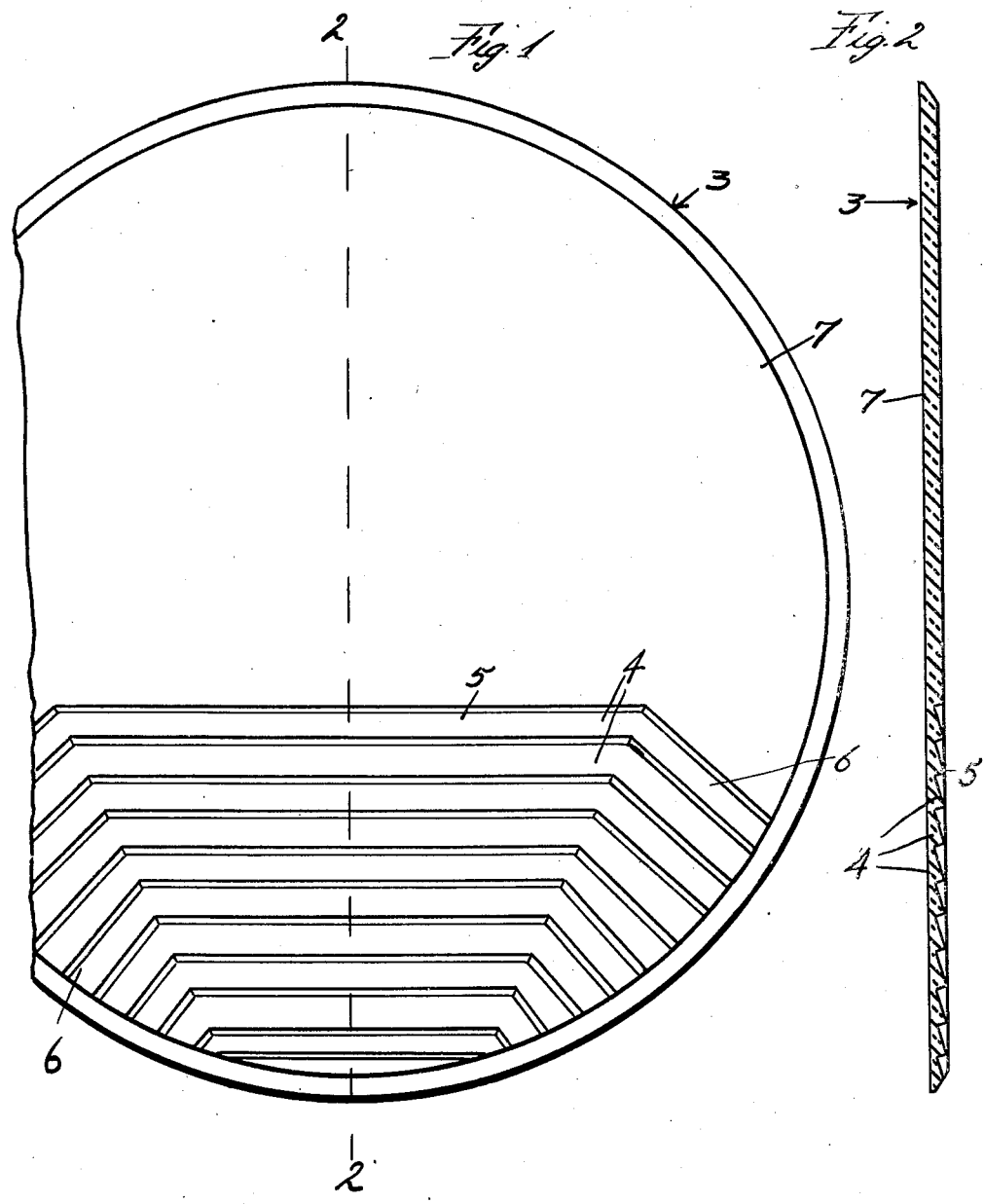

1,861,580

UNITED STATES PATENT OFFICE

WILLIAM O'NEILL, OF FRANKFORD, PENNSYLVANIA

NONGLARE HEADLIGHT LENS

Application filed October 13, 1930. Serial No. 488,290.

My invention relates to new and useful improvements in a non-glare head light lens, particularly adapted for use on the head lamps of automobiles although having practical applications to lamps of other description, especially any lamps used on all kinds of vehicles operated in places occupied by other traffic either vehicular or pedestrian.

One of the objects of the invention is to produce a lens which may be constructed for use in any shape, size, configuration, style or type of lamp required for projecting a beam of light on a roadway or other path of travel.

Another object of the invention is to provide a head light lens so fashioned that a strong beam of light will be projected on to a roadway at a desirable distance from the lamp and yet not affect the eyes of approaching pedestrians, operators or passengers of other vehicles.

A further object of the invention is to produce a lens having prisms located on the outside of the lens and covering substantially one-third of the lower part of said lens for downwardly projecting a strong beam of light and having the major portion or the balance or upper part of said lens translucent through which a soft non-glaring beam of light may be projected.

A still further object of the invention is to produce a lens of the kind mentioned which may be manufactured from any kind of crystal glass, including Flint, Dutch Flint, or common crystal glass, the upper portion of which may be made translucent by frosting the same or by tinting it in any color, especially green, amber, blue and yellow.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is a front elevation of the non-glare head light lens embodying my invention, a portion thereof being broken away.

Fig. 2 is a section on the line 2—2 of Fig. 1.

In carrying out my invention as herein embodied, 3 represents the lens as a whole which may be of any desirable configuration and which is produced from any suitable glass, either plain or colored or partly plain and partly colored or partly frosted to produce a translucent area.

The lower part, which is a minor portion of the entire area, of the outside or front face or surface of said lens has a number of prisms 4 formed therein or thereon so that approximately one-third of the lower part of the lens is made up of prisms and particularly the uppermost prism is somewhat below the horizontal center of the lens when considered as in use or in other words, the area of the lens covered by the prisms terminates short of or below the horizontal center of the lens and the horizontal center of the source of light, which for purpose of description is considered as occupying a position directly behind the center of the lens.

Each prism 4 consists of a horizontal portion 5 and a downwardly projecting oblique portion 6 at each end of the horizontal portion which has the effect of bending the sides of the beam of light so that the latter has a curved effect when shining on a distant object.

The upper part or portion 7 of the lens which is the major portion, and includes approximately two-thirds of the entire area of said lens, is made translucent either by frosting one surface of said upper portion or by coloring the same in any suitable manner as by utilizing colored or tinted glass.

In practice, the rays of light issuing from a source of light behind the lens passing through the upper portion of said lens will be subdued and therefore non-glaring, but some of the rays of light passing through the prisms will be bent down and while being of a very bright or clear nature, will strike the roadway at a suitable distance from the lamp equipped with such a lens on an incline from the lower part of said lens and therefore will not affect the eyes of pedestrians or operators and passengers of other vehicles in line with the upper portion of the lens. The advantages of such an arrangement are believed to be obvious to persons in general as well as to those skilled in this art.

Of course I do not wish to be limited to the exact details of construction as herein shown, as these may be varied within the limits of the appended claims without departing from the spirit of my invention.

Having thus fully described my invention, what I claim as new and useful is:—

1. A lens for a head light comprising an upper light intercepting portion and a lower transparent portion, the upper portion being formed of translucent glass for intercepting the passage of light rays through said upper portion of the lens, and extending into the lower half a substantial distance to form a major upper portion and a minor lower portion and also to form pendent strips at opposite sides of the lens as parts of the light intercepting or translucent portion, the minor transparent portion being formed of transparent glass and provided with light depressing prisms having central horizontal portions and downwardly extending oblique ends, the said central portions and the oblique ends decreasing in length toward the bottom of the lens.

2. A lens for a headlight comprising an upper light intercepting portion and a lower transparent portion, the upper portion being formed of translucent glass and extending into the lower half a substantial distance to form a major upper portion and a minor lower portion and also to form light intercepting pendent strips at opposite sides of the lens, said major and minor portions meeting on a straight line between said pendent strips, said minor transparent portion being formed of transparent glass and provided with light depressing prisms having central horizontal portions parallel with the meeting line of the major and minor portions of the lens and downwardly and outwardly extending oblique ends.

In testimony whereof I have hereunto affixed my signature.

WILLIAM O'NEILL.